INVENTORS
F.E. WILEY
H.C. WAIN

United States Patent Office 3,074,108
Patented Jan. 22, 1963

3,074,108
APPARATUS FOR BIAXIALLY ORIENTING
THERMOPLASTIC FILM
Fred E. Wiley, Longmeadow, Mass., and Harry C. Wain, Somers, Conn., assignors to Phillips Petroleum Company, a corporation of Delaware
Filed Apr. 25, 1960, Ser. No. 24,611
8 Claims. (Cl. 18—14)

This invention relates to apparatus for the biaxial orientation of thermoplastic film. In another aspect this invention relates to apparatus which is especially suitable for starting up an operation for the biaxial orientation of thermoplastic film. In still another aspect the invention relates to apparatus which permits the regulation of the relative amounts of machine and transverse orientation in the biaxial orientation of film.

Tough films of thermoplastic polymers, especially polymers of olefins such as polyethylene, polypropylene or copolymers of ethylene with higher olefins such as propylene or 1-butene can be made by biaxially stretching the film at controlled temperatures. Conventionally such film may be oriented biaxially by expanding extruded tubing with pressurized air or by gripping the edges of a flat sheet or ribbon and stretching the film in two directions at right angles. The first of these methods produces what is known as blown film. In both techniques a high degree of uniform orientation is difficult to obtain. Considerable effort has been directed toward finding methods for accomplishing biaxial orientation on a continuous and practical basis.

We have found that films of thermoplastic polymers such as polymers of olefins can be oriented biaxially by stretching an extruded tubing of the polymer, which has been partially cooled, over an expansion member having a substantially greater cross section transverse to the direction of film movement than the original extruded tubing. Preferably the expansion member is orbicular, such as a disk or a ring, with a greater diameter than the extruded tube. The expansion of the tubing to a larger diameter produces transverse orientation and orientation in the machine direction is produced in the conventional manner by longitudinal stretching. In order to satisfactorily produce high strength film by this method so that the film has a good balance of properties, that is, high tensile strength in both its machine and transverse directions, it is important to control the temperature at which the biaxial sretching is effected.

In one aspect of our invention the control of the temperature of polyolefin film undergoing orientation in the manner above described is facilitated by employing in combination with the die for extruding the tube and the annular expansion means for enlarging the diameter of the tube, means for cooling said tube between the die and the expansion means by contacting the substantially natural contour of the inner surface of said tube with said cooling means as the tube passes from the die opening over the annular expansion means. In another aspect of our invention the temperature control is facilitated further by employing means for contacting the outer surface of the expanding tubing with cooling fluid in combination with annular baffle members which can be positioned between the die and the expansion means so that the area of the tube which is contacted by the cooling fluid can be adjusted.

In another aspect of our invention apparatus is provided for starting up the biaxial orientation process. It is quite difficult to uniformly expand the extruded stalk of polymer over the expansion ring of substantially larger diameter. Once the extruded film is stretched over the larger ring very little difficulty is experienced in maintaining a continuous stretching of the film when proper operating conditions are employed. We have provided, therefore, a starting mechanism which employs a multiplicity of arcuate, cam activated arms which are pivoted from an annular support member positioned behind the expansion ring, said arms having hooks on their unattached ends with which to grip the extruded tube. As the support member is moved away from the expansion ring said arms uniformly move outwardly stretching the tubing over the expansion ring.

In still another aspect of our invention an improvement in the apparatus above described is provided by means for applying frictional resistance to the tubing undergoing expansion so that the action of the longitudinal (machine direction) stretching can be restricted to a portion of the expanding tubing between the die and the expansion means.

It is an object of our invention to provide an improved apparatus useful for the biaxial orientation of thermoplastic film. It is another object of our invention to provide apparatus which enables improved control of the temperature of film undergoing biaxial orientation. Still another object is to provide apparatus which facilitates the start up of a biaxial orientation operation wherein an extruded tubing is stretched over an annular expansion member of substantially larger diameter. A further object is to provide the means whereby the relative amounts of machine and transverse orientation can be adjusted in an operation wherein extruded tubing is stretched over an expansion ring. These and other objects of our invention will become apparent to those skilled in the art from the following discussion and drawings in which:

Figure 1:
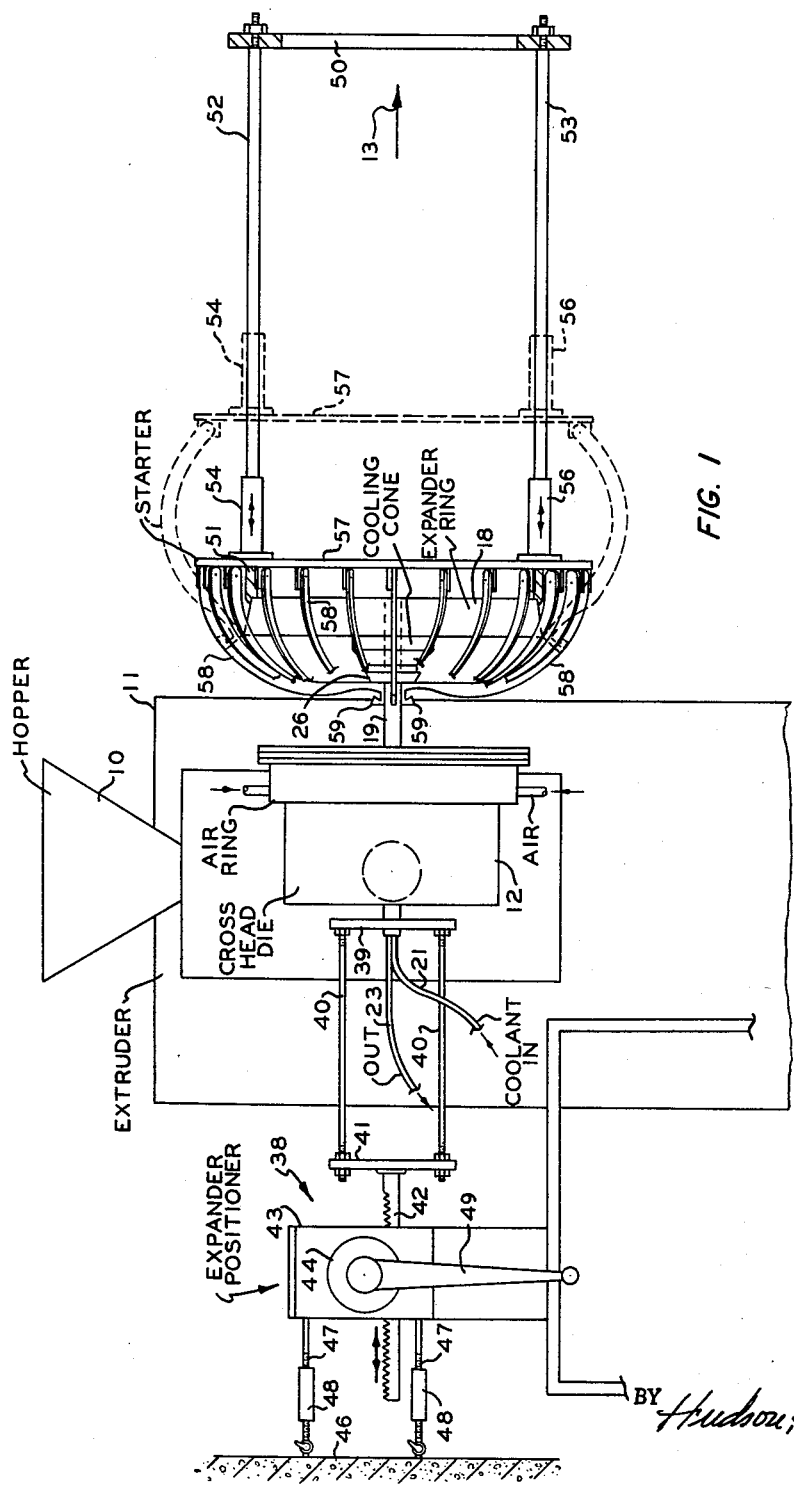
FIGURE 1 is an elevation view of the apparatus of our invention showing two relative positions of the start up mechanism.

Polyolefin film such as polyethylene must be extruded under molten conditions and oriented by stretching after the film has been partially cooled and solidified. According to our invention such film can be continuously formed and oriented biaxially by extruding a tubing, cooling this tubing to orienting temperature, stretching the cooled tubing lineally (in the machine or extrusion direction) and simultaneously stretching the cooled tubing over a ring member of substantially larger diameter than the tubing as extruded. By "substantially larger diameter" we mean in the order of at least about 4 times the extruded tube diameter. A smaller amount of expansion as might be produced when the extruded tube is passed over a sizing mandrel or sleeve is totally inadequate to produce any significant amount of transverse orientation. Preferably the expander ring or disk has a diameter at least 8 times the diameter of the originally extruded tube. We have successfully oriented polyethylene film biaxially to produce a product having high and balanced tensile properties with our method using an expander ring having a diameter as much as 20 times the diameter of the extruded tube.

The expander ring of substantially larger diameter than the die orifice produces transverse stretching of the film at the same time that the take-up reel stretches the film in the machine direction. We have found that sequential stretching (first in one direction and then in the other 90° to the first) is to be avoided. The second treatment inevitably destroys some of the orientation produced by the first. Films of improved clarity and impact strength with an overall better balance of tensile properties can be produced with the simultaneous biaxial orientation of our invention. As stated above, the expander ring should have a diameter of at least 4D where D is the diameter of the die orifice. Preferably the diameter of the expander is 8D or more. Thus, stretching the tube over this expander ring produces an increase in tube circumference of at least 400 percent. At the same time the linear stretching should produce an increase in length of the tube of at least about 200 percent. The thickness drawdown ratio will therefore, be at least 8 to 1. We prefer to orient polyethylene film with an expander diameter of at least 8D and sufficient linear stretching to produce a thickness drawdown of at least 25 to 1. It is desirable in most instances to stretch the film longitudinally by about the same amount that it is stretched transversely. For optimum biaxial orientation of polyethylene film it is preferred that the thickness drawdown ratio be in the range of 50 to 1 to 200 to 1. Tensile strengths of over 20,000 pounds per square inch can be obtained in this manner. It is also possible to substantially improve the clarity of the film by this severe drawdown.

In order to take maximum advantage of the orientation produced as the tubing is stretched over the expander ring it is desirable that the polymer be cooled to orientation temperature before any substantial amount of stretching occurs.

As a general rule the orientation temperature for crystallizable polymers such as solid polymers of olefins, e.g., polyethylene, polypropylene, and copolymers of ethylene with higher olefins, is within about 50° F., above or below, the polymer softening temperature as subsequently defined. For polyethylene having a density determined as subsequently described of about 0.950 to 0.970 grams per cubic centimeter at 25° C., the softening point is about 260° F. and the polymer can be oriented at temperatures within the range of about 210° to 310° F. At the higher temperatures quenching is generally necessary immediately after orientation. Usually this polymer is extruded at about 330° F.

We prefer to practice our invention within a narrower range of about 20° F. above or below the softening temperature. For the above mentioned high density polyethylene a temperature below 270° F. has been found most satisfactory. Many of these polymers exhibit a sticking tendency if they contact a cooler surface while above about 270° F.; although this characteristic is less pronounced in polymers of higher molecular weight. The sticking problem, when it exists, can be controlled by observing the appearance of the extruded tube between the die and the expander. A visible "frost line" will appear as the tube cools. It is desirable to cool the extruded tube immediately after it issues from the die so that the frost line will form before the tube contacts the cooling cone or the baffles. Further cooling of the entire film can then be hastened with the cooling cone which preferably is held at about 190 to 225° F. when orienting high density ethylene polymer.

Attempts at running a long extended stalk from the extruder so that the extruded tubing could be cooled substantially before stretching over an expansion disk have been for the most part unsuccessful because the stalk tends to wander off center and strike the central rod which supports the expansion disk. It is, therefore, desirable that effective means for cooling the extruded tubing in a relatively short distance, e.g., within about 2 inches, be provided. The apparatus of our invention which performs this cooling task can best be described by reference to the drawings.

In FIGURE 1 an overall elevation view of our apparatus is shown. In the operation thereof granular or pelletized polymer is fed into hopper 10 of plastics extruder 11. The extruder is equipped with a cross head die 12, the die having an annular opening for the extrusion of tubing. The tubing is extruded along an axis indicated by the arrow 13. An enlarged view of the cross head die and the apparatus for stretching and cooling the tubing is shown in FIGURE 2.

Figure 2:
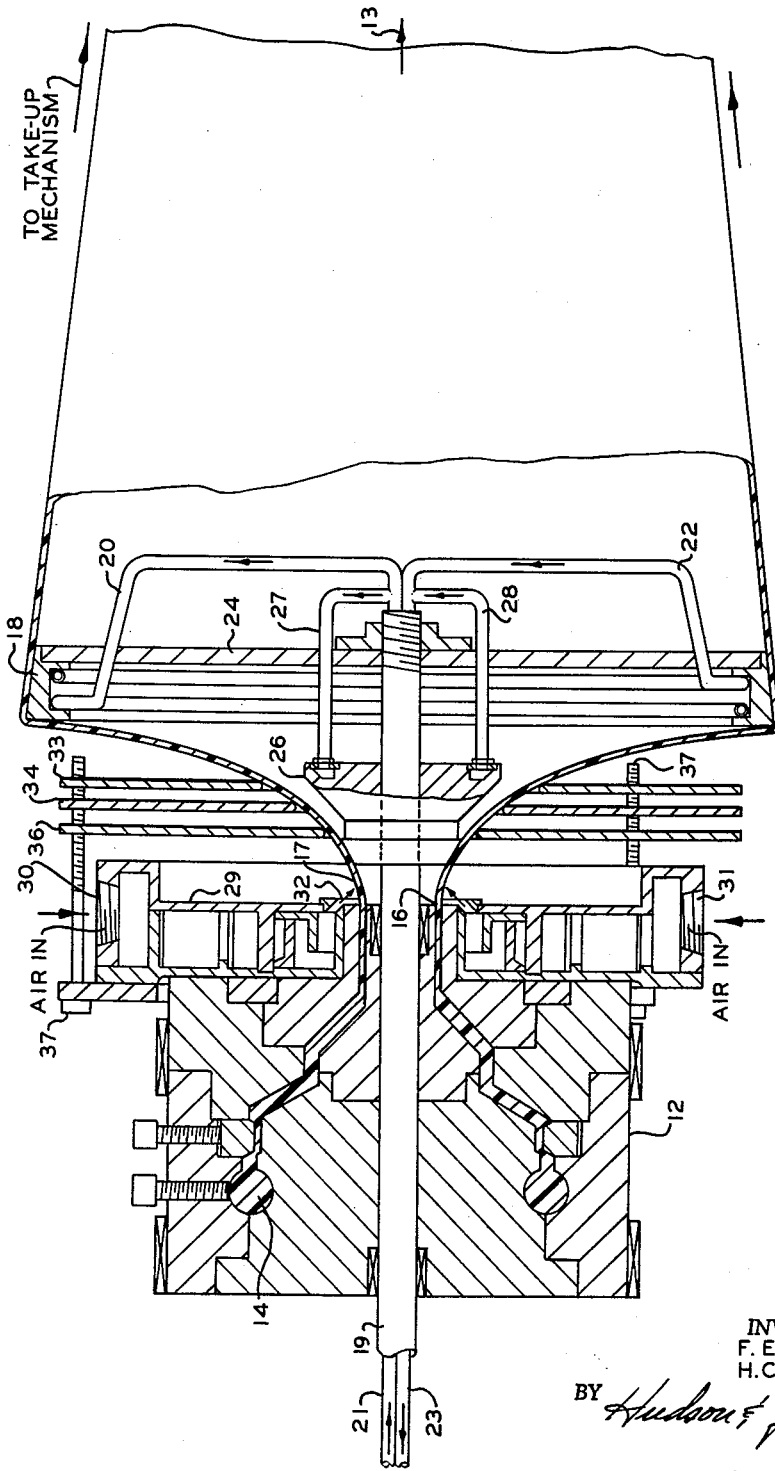
FIGURE 2 is an elevation view in section of the apparatus showing the relative positions of the extrusion die, expansion ring, internal and external cooling means.
Figure 3:
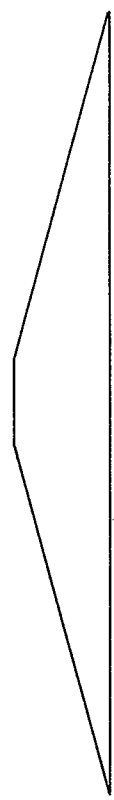
FIGURES 3–3d are sketches showing a number of alternative shapes which can be used for the internal cooling means.
Figure 3A:
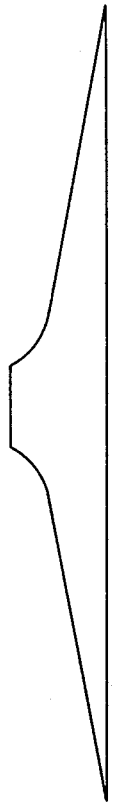
Figure 3B:
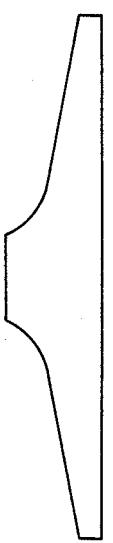
Figure 3C:
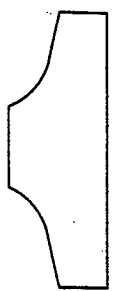
Figure 3D:
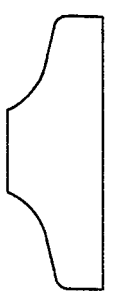

As shown in FIGURE 2 the molten polymer 14 is extruded through the annular die opening 16 in the form of a tubing 17. Plastic tubing 17 is then stretched over an expansion ring 18 of substantially larger diameter. Expanded tubing is then drawn to a take up mechanism not shown. The combination of stretching forces imparted by the take up mechanism and the expansion ring produces simultaneously a biaxial orientation in the cooled tubing between the die and ring 18. Expansion ring 18 is supported by pipe 19 which passes through the cross head die along the axis of extrusion 13. Expansion ring 18 is cooled by passing cooling water through tubing 20 from an inlet line 21 passing centrally through support pipe 19. The cooling water is returned through tubing 22 and passes back through the support pipe 19 in line 23. Expansion ring 18 is held in position by disk 24. A spider ring could be used instead of disk 24.

In order to reduce the tendency of the film to stick to the expansion ring this ring is tapered slightly as shown in FIGURE 2 so that the frictional forces between the film and the expander ring are reduced. The friction can be further reduced by employing an expansion ring having a matte surface. It was found that a highly polished surface on the expander ring causes the film to seize and break. When the surface of the ring was slightly roughened as by rubbing with a coarse grade of emery cloth, the running characteristics were greatly improved.

Since it is necessary to cool the film before it undergoes the stretching action means is provided to effect this cooling immediately after the tubing leaves the extrusion die in the form of an internal cooling cone 26. Cooling cone 26 is positioned so that it does not produce any significant stretching of the film but merely contacts the substantially natural contour of the tubing as it is stretched over the expansion ring. While the tubing in FIGURE 2 is shown to assume a trumpet shape between the die and the expansion ring this representation is made for clarity in order that the relative position of the several pieces of equipment could be shown without confusion. In actual operation the expansion ring is moved to within about 2 or 3 inches of the die so that the film expands abruptly in a radial fan out from the unexpanded tube.

Since the cooling cone is to conform to substantially the natural contour of the tube undergoing expansion the contacting surface of the cooling cone can take a variety of different shapes. Several examples of the shape the cooling cone may take are shown in the diagrams of FIGURES 3, 3a, 3b, 3c and 3d. The shape of the cooling cone is dictated by the amount of cooling desired and the distance that the expander ring is from the die in normal operation. The thickness of the tubing as it is extruded also has a bearing upon the shape that the expanding tube takes and hence affects the design of the cooling cone. For versatility the preferred configuration is that shown in FIGURE 2. Although a large area is not contacted by the cooling cone the point of contact is close to the die so that the tube can be cooled to the proper temperature for orientation before any substantial amount of stretching takes place. The cooling cone is cooled by circulating water through it, the water entering through inlet tube 27 which is supplied by tube 21. The cooling water leaves the cone through tube 28 connected to outlet tube 23 in support pipe 19. Separate cooling systems may be provided for the expansion ring 18 and the cooling cone 26.

In a preferred embodiment of our invention the outside of the tube is cooled by contacting it with a blast of cool gas from ring 29. Cool air, for example, is supplied to air ring 29 through openings 30 and 31 and passes through a labyrinth which equalizes the air pressure around the ring at the exit ports 32. Cool air is blown onto the tube in a spiral direction and at an angle of about 45° to the axis of extrusion. The area of the tube which is contacted by the cooling air can be varied by the relative positions of annular baffles 33, 34 and 36 which are supported on threaded bolts 37. If an inert gas is desired, carbon dioxide or nitrogen can be used for cooling purposes.

Other methods of cooling the tube between the extruder orifice and the expander ring can be employed to supplement or replace the air ring. For example, a water spray can be used to hasten the cooling of the extrudate. Another suitable method involves extruding the tubing into a cooled bath. In this technique the die is positioned to extrude upwardly or down into a body of liquid, preferably water which is maintained in position to contact the outside of the extrudate as it issues from the orifice. The cooling cone can be replaced in this instance by circulating liquid, such as water, within the tubing between the die and the expander ring. For ease of control, however, we prefer the arrangement utilizing the air ring and cooling cone, as shown in the drawings.

Referring again to FIGURE 1 the relative positions of the expander ring 18 together with cone 26 can be adjusted by positioning mechanism 38. Support pipe 19 which passes through the cross head die along the axis of extrusion is fastened by plate 39 and rods 40 to plate 41 which in turn is fastened to ratchet 42. Pipe 19 is linked to ratchet 42 in this manner to provide for the entrance and exit of the cooling water through tubes 21 and 23. A gear, not shown, meshes with a ratchet 42 and is mounted on a spindle journaled in bearings 44 in frame 43.

Frame 43 is fastened to a permanent structure such as a wall 46 by rods 47 which can be adjusted by turnbuckles 48. Thus all of the longitudinal stress which is imparted to the expander ring by pulling the tube over the ring is transferred back through the support pipe 19, rods 40, ratchet 42, rods 47 and turnbuckles 48 to the permanent structure 46. In this way the longitudinal stress along axis 13 is relieved from the cross head die. The gear which meshes with ratchet 42 can be rotated by turning handle 49 so that pipe 19 can be moved in or out through cross head die 12 and the expander ring can be positioned nearer the die after the extrusion operation has begun.

As pointed out previously it is quite difficult to expand the extruded tubing over the expander ring initially. This operation can be readily performed, however, with the starter mechanism which is shown in FIGURE 1. The start up mechanism comprises a frame made up of two ring members 50 and 51 connected by support rods 52 and 53. Sleeves 54 and 56 are slidably mounted on rods 52 and 53 and are fastened to supporting ring 57. The supporting ring 57 together with sleeves 54 and 56 can, therefore, be moved back and forth on supporting rods 52 and 53. In operation, ring 51 is mounted on the back of expander ring 18 so that support ring 57 can be moved along the frame to various positions relative to expander ring 18. A plurality of arcuate arms 58 are pivotally mounted about the periphery of support ring 57. Each arm 58 has a hook 59 on its unattached end with which it can grip the extruded tube. When support ring 57 is moved to its forward position near expander ring 18, arms 58 curve over and around ring 18 and cooling cone 26 until the hooked portion 59 comes to rest on support pipe 19.

In starting up the operation polymer tubing is extruded from the die until it reaches hooks 59 at which point ring 57 is moved away from ring 18 in the direction indicated by arrow 13. As ring 57 is moved away from ring 18, arms 58 are caused to move out away from pipe 19 gripping the end of the polymer tube with hooks 59 as they do so. Uniform tension is thus applied to the polymer tube as it is expanded to the diameter of expander ring 18 and as ring 57 is moved further back away from ring 18 the expanded polymer tube is pulled over the outer rim of ring 18. The tube is then detached from hooks 59 and the starting mechanism removed from ring 18. The polymer tube can then be pulled manually to a take up mechanism in order to begin a continuous operation.

Referring again to FIGURE 2, after the polymer tube has been attached to the take up mechanism and continuous extrusion is begun, the expanding tubing between the die and ring 18 is cooled by air from air ring 29. As the polymer tube is cooled, there is a visible frost line which can be used as a guide in adjusting the positions of the various cooling members such as cone 26 and baffles 33, 34 and 36. If anything strikes the extruded tube ahead of the visible frost line, the operation will probably stop. Beyond the frost line, the expanding film can withstand rather severe physical or thermal shock without ceasing to run. A thin strong skin as indicated by the frost line on the outside of the film can drag the hot soft inside of the tube over a cooling surface.

In order that more air could be used to make the frost line approach the die outlet baffle 33 is moved into a position as shown in FIGURE 2 until it strikes the expanding film. This limits the area of the film that is contacted by the cooling air to the area between baffle 33 and the die. As the frost line approaches the die still further, baffle 34 can be moved into the position shown which further reduces the area contacted by the cooling air and in like manner baffle 36 is finally moved into its operative position. Not only do the baffles thus positioned concentrate the cooling air on the initial portion of the film which is undergoing a minimum of expansion but they also prevent supercooling the film which is being expanded the greatest amount. Cooling cone 26 can be moved into position to contact the interior surface of film 17 by adjusting the position of pipe 19 as previously disclosed. In the same adjustment expander ring 18 is moved closer to the die opening. It is also possible to adjust the position of cooling cone 26 in relation to ring 18 by slitting the film just beyond ring 18 and adjusting a positioning screw, not shown.

Figure 4:
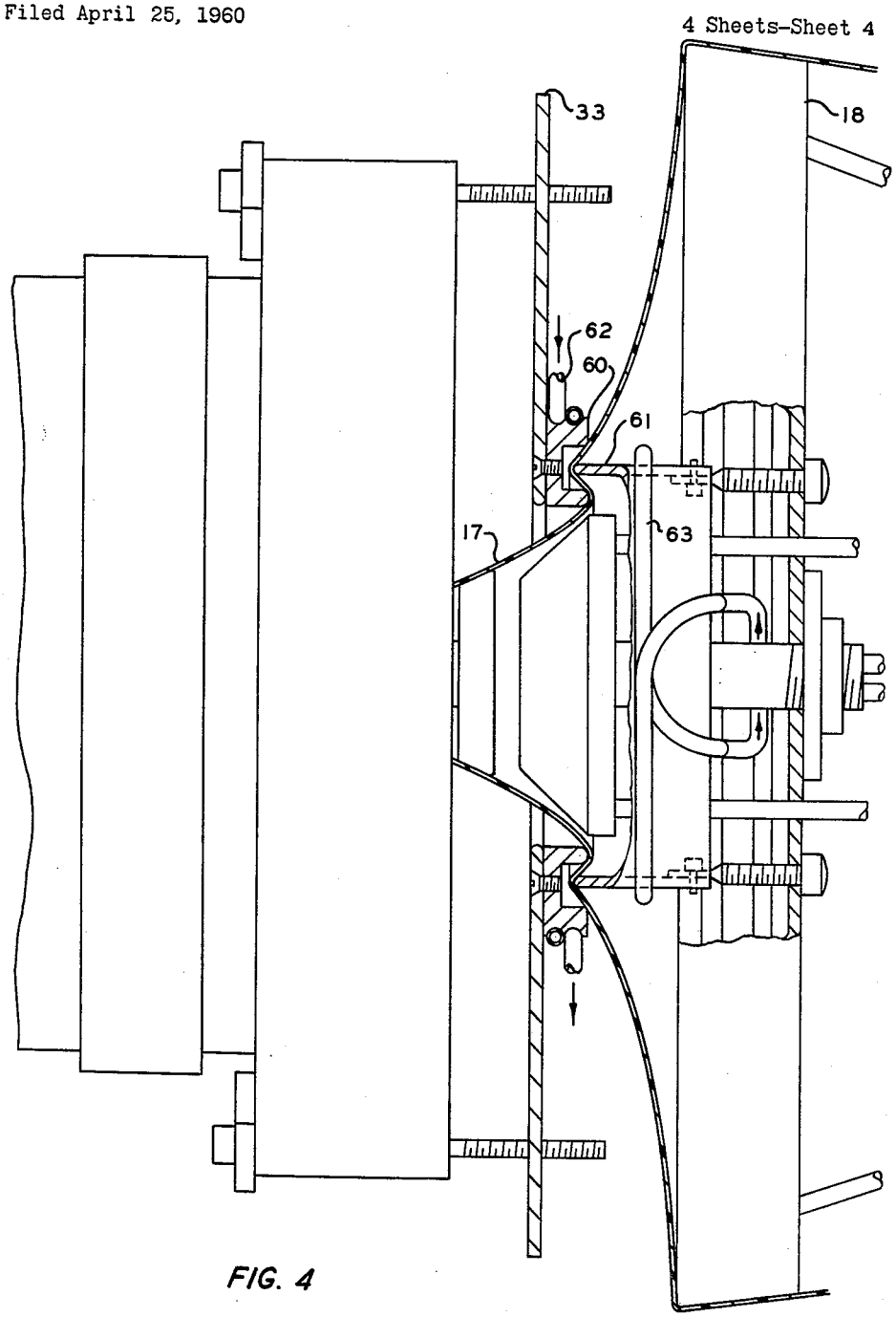
FIGURE 4 is an elevation view partly in section showing the apparatus for biaxially orienting film in combination with the means for applying a frictional resistance to the tubing undergoing stretching.

In another aspect of our invention apparatus is provided which is used to adjust the relative orientation of the film in the transverse and machine directions. This feature is shown in detail in FIGURE 4. In this embodiment baffle 33 is used to hold a cooled ring member 60 which is positioned to mesh with another cooled ring member 61 on the opposite side of the expanding tube. As ring members 60 and 61 are moved together tube 17 is caused to pass through a labyrinth and the friction imposed thereby reduces the machine direction stretch imparted to that portion of the tube between the die and ring 60. This braking mechanism forces most of the machine direction orientation to take place in the expanded tubing between baffle 33 and expander ring 18. In order to effect further cooling of the tube and prevent the tube from sticking to the braking mechanism, ring 60 is cooled by water passing through a coil of tubing 62 whereas ring 61 is cooled in a similar manner by water passing through tubing coil 63. The water which supplies coil 63 can be obtained from the same source which supplies the cooling cone and the expander ring. It is also desirable in some instances that each of these cooled members be supplied by a separate source of cooling water so that their temperatures can be separately adjusted.

A variation in the drawdown ratio in a single extruded tubing can be used to provide an oriented tubing having clear and frosted panels. Frosted panels have a higher impact strength than do the clear panels in such an article and combine the advantages of visibility and strength for an article such as a vegetable package. Such a tube can be made by extruding the polymer through an annular die opening which has a varied width. The extruded film, therefore, has a varied thickness and the thin sections cool more rapidly and resist drawdown earlier than the thick sections. The thicker sections draw down to a greater degree and become clear while the thinner sections remain frosted or translucent. For example, a draw down ratio of 25 to 1 produces a tough frosted film whereas a draw down ratio of 50 to 1 produces a clear film that does not have as high an impact strength as the frosted film.

In addition to polyethylene and other polymers of olefins, other thermoplastics which are increased in tensile strength by orientation can be processed with my invention. Examples of other plastic materials which are suitable are polystyrene, polymers of vinylidene chloride, polyamides such as a polymer of hexamethylenediamine and adipic acid, polyesters, such as polymers of ethylene terephthalate, and rubber hydrochloride.

The size of the expander ring depends upon the diameter of the die opening. For example with die openings of about ¾ to ⅞ inch inside diameter expander rings of 4 to 18 inches can be satisfactorily used. The water temperature in the expander ring can vary from about 80 to 200° F. Take off rates of 5 to 40 feet per minute are readily developed. Generally the film has a wall thickness of about 1/16 to 3/16 inch when extruded and the oriented film can vary in thickness from 0.2 to 10 mils and greater. We prefer to use our apparatus for the orientation of relatively thin films, e.g., up to 1.5 mils in thickness. Complete cooling of the film as it passes over the expander ring is desirable to prevent any tendency for the stock to tear off at the expander and also to prevent orientation in the machine direction between the expander and the take up mechanism. Such post orientation unbalances the film properties. Additional cooling at the expander ring can be provided by using a water cooled wick which contacts the outside of the film at the expander ring. If desired the expander ring can be made of a porous material and air passed through it to reduce friction.

To further illustrate our invention the following example is given. The conditions of operation should be construed as being typical and not to limit our invention unduly.

Example

Two types of ethylene polymer were extruded and biaxially oriented to produce strong, transparent film by cooling the extruded tube and pulling it over an expander ring. The die orifice produced a tube having 1 inch O.D., 62.5 mils thick. This tube was cooled to below 270° F. and pulled over a 12 inch O.D. expander ring with a thickness drawdown ratio of about 125 to 1. The tube was cooled externally with air at room temperature (about 75° F.) and internally with a cooling cone 2 23/32 inches in diameter. The cooling cone was shaped as shown in FIGURE 2. A baffle (33 in FIGURE 2) having a 3¾ inch diameter center opening was placed 0.75 inch from the air ring during start up and a baffle (34 in FIGURE 2) having a 2½ inch diameter center opening was placed in contact with the 3¾ inch baffle after the run started.

The runs were made using a 1 inch 15:1 L/D N.R.M. extruder with the following conditions as typical.

Die temperature _____ 320° F.
Barrel temperature _____ 320° F.
Extrusion rate _____ About 6 lbs./hr.
Expander ring cooling water in _____ 110° F.

The tensile and impact properties of the oriented film are shown in the following table. Tensile properties are shown for both machine direction (MD) and transverse direction (TD).

| Resin Type | Tensile properties [1] | | | | | | Drop ball impact test [2] | | Running conditions [3] | | |
|---|---|---|---|---|---|---|---|---|---|---|---|
| | Ultimate strength, p.s.i. | | Yield strength, p.s.i. | | Elongation, percent | | Film thickness, mils | Break-through ht. in. | Takeoff speed, f.p.m. | Cooling air, pressure inches of H$_2$O | Cooling cone, °F. |
| | MD | TD | MD | TD | MD | TD | | | | | |
| 0.2 melt index, linear polyethylene, 0.960 density | 6,100 | 9,200 | 4,100 | [4] 9,200 | 160 | 50 | 0.5 | 22 | 6 | 25 | 220 |
| | 7,600 | 11,900 | 5,000 | [4] 11,900 | 170 | 40 | 0.5 | 20 | 6 | 28 | 210 |
| | 11,800 | 20,500 | 6,500 | [4] 20,500 | 190 | 60 | 0.5 | 21 | 7 | 9½ | 224 |
| | 12,000 | 11,900 | 5,800 | 10,900 | 150 | 75 | 0.3 | 16 | 12 | 15 | 225 |
| | 8,600 | 21,300 | 4,800 | [4] 21,300 | 200 | 40 | 0.5 | 24 | 7 | 8 | 225 |
| 0.3 melt index, 0.950 density, ethylene/1-butene copolymer. | 7,400 | 14,500 | 4,800 | 14,000 | 170 | 80 | 0.5 | 22 | 8 | 25 | 208 |
| | 8,000 | 10,200 | 4,400 | [4] 10,200 | 150 | 30 | 0.5 | 20 | 7 | 22 | 198 |
| | 7,800 | 9,100 | 3,800 | 8,500 | 70 | 70 | 0.5 | 22 | 9 | 22 | 205 |

[1] Tensile tests run on inclined plane tester. ¼" die-cut strip specimens used. 1" clamping distance. Stressing rate about 125,000 p.s.i./min.
[2] ¾" dia. 29 gm. ball dropped on 1⅝ dia. film sample from heights increasing in 2" increments. Height of failure from cumulative impacts reported.
[3] Polymer tube is extruded: 1" O.D., 0.0625"=62 mils thick. Thickness drawdown 62.5/0.5=125:1. Expander ring=12". Cooling cone=2 23/32 in. diameter
[4] These samples broke without yielding. Recorded value is breaking stress.

Density of ethylene polymers can be determined by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density is determined by placing a smooth, void-free pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity. With the balance standardized to read 1.000 with a sample of distilled water at 4° C. the specific gravity will be numerically equal to density in grams per cc.

Melt index is determined by ASTM D1238–52T using 5 samples at 2 minute intervals, averaging the 5 values (weights), discarding any values which deviate from the average by more than 5 percent (by weight), reaveraging and multiplying by 5 to obtain the amount of polymer extruded in 10 minutes.

Softening point is determined by plotting softness values vs. temperature and the temperature at which the slope of the resulting curve equals 0.0035 softening units per degree F. is the softening temperature. "Softness" is determined by the method of Karrer, Davis and Dieterich, Industrial and Engineering Chemistry (Analytical edition) 2, 96, (1930).

The above data show that strong film can be produced from ethylene polymer according to our invention.

Various modifications in our invention as described can be made by those skilled in the art without departing from the spirit or scope of our invention.

We claim:

1. Apparatus for imparting biaxial orientation to thermoplastic film comprising, in combination, a die having an opening therein for forming tubular shapes, means for extruding plastic material through said die to form a tube, means for pulling said tube from said die to produce longitudinal stretching, expansion means positioned between said pulling means and said die, for enlarging the diameter of said tube to produce transverse stretching and means between said die and said expansion means for bringing the tube to orientation temperature before substantial expansion thereof, including means for blowing cooling gas onto the outside of said tube and at least one annular baffle movably positioned around the outside of said tube between said means for blowing cooling gas and said expansion means, whereby the zone of cooling by said gas can be restricted and the degree of cooling of said tube limited.

2. Apparatus for imparting biaxial orientation to thermoplastic film comprising, in combination, a die having an opening therein for forming tubular shapes, means for extruding plastic material through said die to form a tube, means for pulling said tube from said die to produce longitudinal stretching, an expander ring for enlarging the diameter of said tube to produce transverse stretching, said expander ring having a diameter at least eight times that of said tube as extruded and being positioned between said pulling means and said die and over which said tube must pass, and means between said die and said expansion means for bringing the tube to orientation temperature before substantial expansion thereof including an air ring positioned about said die for blowing cooling air onto the outer surface of said tube issuing from said die, and at least one annular baffle movably positioned around the outside of said tube between said air ring and said expander ring whereby the zone of cooling by air from said ring can be restricted and the degree of cooling of said tube limited.

3. The apparatus of claim 2 including a conical cooling member positioned between said die and said expander ring and having a surface which coincides substantially with the natural contour of a part of the inner surface of said tube undergoing expansion.

4. The apparatus of claim 3 wherein both said cooling member and said expander ring are individually positionable at varying distances from said die.

5. The apparatus of claim 1 comprising a plurality of said annular baffles having inner openings of graduated diameters.

6. Apparatus for imparting biaxial orientation to polyolefin film comprising, in combination, a plastics extrusion means, a die fastened to said extrusion means having an annular opening for formation of a tube, an expander ring positioned in the path of the extrudate concentric with the extrusion axis of said die, said expander ring having a diameter at least eight times the diameter of said annular opening, and means for starting said tube over said expander ring comprising a frame having a plurality of horizontal guide members and positioned on the side of said expander ring away from said die, a ring member somewhat larger than said expander ring and slidably mounted on said guide members, a plurality of arcuate arm members pivotally mounted around the periphery of said ring member, said arm members having hooks on their unattached ends for gripping said tube, said arm members extending radially inward toward the extrusion axis and around said expander ring when said ring member is positioned close to said expander ring and being forced outwardly by said expander ring as said ring member is moved away from said expander ring.

7. Apparatus for imparting biaxial orientation to polyolefin film comprising, in combination, a plastics extrusion means, a cross head die positioned on the nozzle end of said extrusion means, said die having an annular opening for extrusion of a tube, a rod passing through said cross head die along the axis of extrusion, a liquid cooled expander ring fastened to said rod in the path of the extrudate, the diameter of said expander ring being at least eight times the diameter of said annular opening, a conical cooling member fastened to said rod between said expander ring and said die, said conical member being liquid cooled and having a surface configuration which substantially coincides with the natural contour of a part of the inner surface of said tube while being continuously extruded and drawn over said expander ring, conduit means within said rod for passing cooling liquid to and from said expander ring and said conical member, an air ring positioned about said die for contacting the outside of said tube with cooling air as the tube issues from the die, a plurality of annular air baffles supported from said cross head die and positionable between said air ring and the tube being stretched over the expander ring, the inner openings of said baffles being graduated in diameter so that the baffles can be positioned to block off progressively larger zones from said cooling air and thereby limit the degree of cooling said tube, and adjusting means for moving said rod, expander ring and conical member in relation to said cross head die.

8. The apparatus of claim 7 wherein at least one arc of the annular opening of said die varies in width from the remainder of said opening so that the extruded tube contains panels of varying thickness.

References Cited in the file of this patent

UNITED STATES PATENTS

| | | |
|---|---|---|
| 2,223,057 | Bosel et al. | Nov. 26, 1940 |
| 2,337,927 | Reichel et al. | Dec. 28, 1943 |
| 2,556,295 | Pace | June 12, 1951 |
| 2,632,206 | Pierce | Mar. 24, 1953 |
| 2,641,022 | Kress | June 9, 1953 |
| 2,668,324 | Johnson | Feb. 9, 1954 |
| 2,708,772 | Moncrieff | May 24, 1955 |
| 2,720,680 | Gerow | Oct. 18, 1955 |
| 2,750,631 | Johnson | June 19, 1956 |
| 2,987,767 | Berry et al. | June 13, 1961 |

FOREIGN PATENTS

| | | |
|---|---|---|
| 713,841 | Great Britain | Aug. 18, 1954 |
| 784,920 | Great Britain | Oct. 16, 1957 |